United States Patent [19]

Nelson

[11] 4,429,625
[45] Feb. 7, 1984

[54] COOKING SHEET AND LIFTER FOR POULTRY, MEAT AND THE LIKE

[75] Inventor: Robert H. Nelson, Calgary, Canada

[73] Assignee: R. H. Nelson Holdings Ltd., Calgary, Canada

[21] Appl. No.: 340,511

[22] Filed: Jan. 18, 1982

[51] Int. Cl.³ .............................................. A47J 37/06
[52] U.S. Cl. ...................................... 99/425; 99/426; 99/445; 294/144; 294/149
[58] Field of Search .................. 99/422, 425, 426, 444, 99/445, 450, DIG. 15; 294/172, 144, 149, 156, 167

[56] References Cited

U.S. PATENT DOCUMENTS

| | | | |
|---|---|---|---|
| 1,718,624 | 6/1929 | Baker | 99/450 |
| 2,802,411 | 8/1957 | Riener | 99/DIG. 15 |
| 2,875,683 | 3/1959 | Burns | 99/425 |
| 3,164,257 | 1/1965 | Foy | 294/144 X |
| 3,292,831 | 12/1966 | Moen | 99/426 X |
| 3,338,486 | 8/1967 | Gaylor | 294/167 |
| 3,509,814 | 5/1970 | Karapetian | 99/445 |
| 3,749,000 | 7/1973 | Vidjak | 99/425 |
| 4,184,421 | 1/1980 | Ahlgren | 99/450 |

Primary Examiner—Billy J. Wilhite
Attorney, Agent, or Firm—Stanley G. Ade

[57] ABSTRACT

Conventional meat and poultry lifters are usually made from heavy wire and the like in the form of a frame so that the meat or poultry can slip out when lifted from the pan. Furthermore, the wire frame often cuts into the cooked flesh of the meat or poultry, making it sometimes unsightly and difficult to remove. The present device is stamped out of heavy duty aluminum foil and can be re-used or disposed of, as desired. It is formed into a sheet with handle grips at each end for lifting. It also acts as a baking sheet or tray and is provided with depressed areas which act to guide juices and fats to drainage holes through the sheet and into the cooking pan.

8 Claims, 4 Drawing Figures

U.S. Patent  Feb. 7, 1984  4,429,625
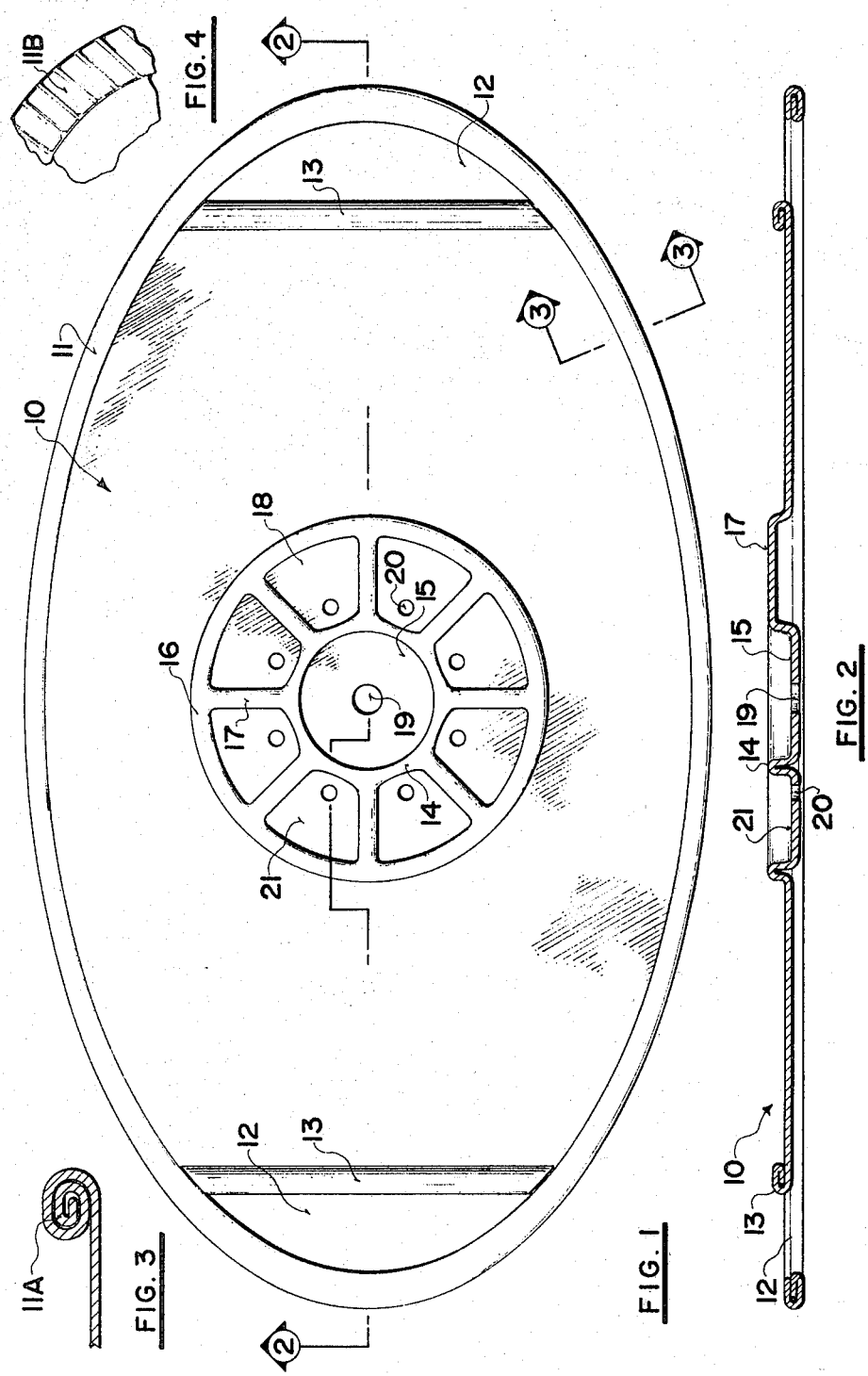

COOKING SHEET AND LIFTER FOR POULTRY, MEAT AND THE LIKE

BACKGROUND OF THE INVENTION

Conventional meat and poultry lifters usually take the form of a foil pan with sides and the like which is relatively rigid or, alternatively, wire framed devices which are either inserted prior to cooking or may be inserted after cooking in order to attempt to faciliate the lifting of the meat or poultry from the cooking environment be it a pan, within an oven or on a barbecue or the like.

Such devices are most unsatisfactory inasmuch as the open framed type of lifting device often permits the contents to slip and become displaced therefrom splashing hot fat which, of course, is extremely dangerous.

Foil pans are relatively expansive to produce and as such, cannot be classified as disposable lifters. Furthermore they do not include drainage apertures but merely act as a substitute for a conventional roasting pan. Examples of the latter include U.S. Pat. Nos. 3,749,000 and 2,875,683.

U.S. Pat. No. 3,338,486 teaches the use of a device which is adapted to be slid under the cooked roast or poultry with the spaced and parallel strips supposedly acting to separate the meat from the pan in which it has been cooked. However this particular device suffers from the same disadvantages that exist with the articulated wire rod type of lifter, namely, that the contents easily slip and become displaced.

The present invention overcomes these disadvantages by providing a combination cooking sheet and lifter which may be placed in an existing roasting pan or, alternatively, may be used upon a barbecue grill. The meat or poultry to be cooked is engaged upon the surface of the sheet and is fully supported thereby during the cooking process and the sheet contains at least one drainage hole that fat, juices and the like drain through into the pan during the cooking process. When it is desired to remove the meat or poultry, handle portions which are formed on the ends of the sheet, may be used to partial wrap the sheet around the meat or poultry in a cradling relationship thus fully supporting the meat or poultry during the lifting process from the pan or barbecue or other cooking environment whereupon it is easily slid from the sheet onto the serving platter or, alternatively, the sheet may be engaged upon the serving platter with the meat or roast remaining thereon.

In accordance with the invention there is provided a combination cooking sheet and lifter for meat, poultry and the like comprising a substantially flat, oval or rectangular sheet of relatively heavy duty aluminium foil, lifting handle portions formed at each end thereof, drainage apertures through said sheet substantially centrally thereof and liquid collecting and guiding areas formed around said drainage apertures, said sheet being flexible thereby cradling the meat or poultry when lifting same from the cooking medium.

Another advantage of the invention is that raised ridges may be formed on the foil sheet during manufacture thus defining depressed or recessed areas which may act as liquid collecting and guiding areas to drainage hole which are pierced through the foil.

Another advantage of the invention is that any raw edges formed during the cutting of the sheet to the desired configuration, may be rolled and/or crimped thus preventing damage from occuring to the hands of the user and also reinforcing the outer perimetrical edge of the sheet and the edges defining the hand engaging areas adjacent each end thereof.

A yet further advantage of the invention is that it can either be reused, if desired, or, can be disposed of inasmuch as the cost of producing same is minimal compared to reusable roasing pans made of foil and the like.

A yet further advantage of the invention is to provide a device of the character herewithin described which is simple in construction, economical in manufacture, and otherwise well suited for the purpose for which it is designed.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

FIG. 1 is a top plan view of the preferred embodiment of the invention.

FIG. 2 is a partial longitudinal section substantially along the line 2—2 of FIG. 1.

FIG. 3 is a fragmentary enlarged cross sectional view along the line 3—3 of FIG. 1.

FIG. 4 is a fragmentary enlarged plan view of a portion of the edge of the sheet showing a crimping reinforcing construction.

In the drawings like characters of reference indicate corresponding parts in the different figures.

DETAILED DESCRIPTION

Proceeding therefore to describe the invention in detail, reference character 10 illustrates generally, the combination cooking sheet and lifter which is preferably made from heavy duty aluminium foil of either one or two ply or more depending upon design parameters. Although the sheet 10 is shown in an oval configuration in FIG. 1, nevertheless it will be appreciated that the overall plan configuration may be rectangular, round, square or any other configuration depending upon design parameters and the end use to which the sheet is to be placed.

The outer perimetrical edge 11 of the sheet is either rolled as illustrated in FIG. 3 by reference character 11A or crimped as shown in FIG. 4 by reference character 11B or a combination of both thus not only eliminating any danger from the relatively sharp edge of the foil but also giving a reinforcement to the perimetrical edge and preventing same from tearing during use.

Hand engaging apertures 12 are formed adjacent each end of the sheet 10 by removing a portion of the foil as by stamping or the like with the aperture being defined by the outer perimetrical rim portion at the ends and by the straight across edge 13 which extends between the extremities of the rim portion defining the aperture 12. This edge 13 is also preferably rolled and/or crimped in a manner similar to the rolled and/or crimped edge 11 both for reinforcing purposes and preventing damage occurring to the hands of the user.

During the formation of the sheet 10, at least one or preferably two raised ridges are formed centrally of the sheet. In the embodiment illustrated in the drawings, an inner annular ring or ridge 14 is formed thus defining a central depression or recessed area 15 and an outer annular ridge 16 is formed concentrically surrounding the inner ridge 14 as clearly shown in FIG. 1.

Radially extending spokes or raised ridges 17 are formed extending between the inner annular ridge 14 and the outer annular ridge 16 and these ridges 17 define substantially pie-shaped depressed or recessed areas 18 between adjacent radial ribs 17 and the inner and outer ribs or ridges 14 and 16. At least one drainage aperture 19 is formed centrally of the sheet and within the central depressed or recessed area 15 and at least one drain hole 20 is formed in each of the pie-shaped depressed or recessed areas 18.

Reference to FIG. 2 will show that the base portion 21 of the pie-shaped recessed or depressed areas 18 preferably slope towards the center of the sheet to assist in the drainage of any juices, fat or the like towards the drainage apertures 20 and similarly, the central depressed or recessed area 15 may also slope towards the center to facilitate drainage through the central aperture 19.

It will of course be appreciated that these sheets are easily stamped out in quantity and that the rolling and/or crimping of the various edges is easily undertaken. Also the various ridges or ribs 14, 16 and 17 are easily formed by means of a conventional press as are the drainage apertures 19 and 20.

In operation, the upper surface of the sheet may be greased if necessary and the roast or meat (not illustrated) is placed thereon preferably extending in a direction from side to side rather than from end to end of the sheet although this of course depends on the shape and configuration of the poultry or meat being cooked. The operator then engages the hands through the apertures 12 and lifts the ends of the foil around the meat or poultry thus cradling same so that it can be transported in the cooking environment. After cooking has been completed, the hands are again engaged through the handle engaging apertures 12 and the meat or poultry is once again cradled by lifting the ends. This causes the juice and fat to flow over the ridges 14 and/or 16 and drain through apertures 20 and/or 19. After all of the juices and fat have drained through the apertures, the entire cooking sheet and lifter together with the contents is transferred to a work surface whereupon the meat or poultry may be removed readily from the cooking sheet.

Alternatively, the contents together with the cooking sheet may be laid upon a platter with the ends of the foil then unrolling to provide access to the meat or poultry.

The cooking sheet and lifter may be cleaned and reused or, alternatively, may be disposed of as desired.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A combination cooking sheet and lifter for meat, poultry and the like comprising a substantially flat sheet of relatively heavy duty aluminum foil which includes ends, lifting handle portions formed at each end thereof, drainage apertures through said sheet substantially centrally thereof and liquid collecting and guiding areas formed around said drainage apertures, said sheet being flexible thereby cradling the meat or poultry when lifting same from the cooking medium said lifting handle portions including a removed portion of the foil sheet adjacent each said end and inboard of the outer periphery of said sheet thereby defining hand engaging apertures.

2. The sheet according to claim 1 in which said liquid collecting and guiding area includes at least one substantially annular, raised ridge portion formed in said sheet thereby defining a recessed or depressed area, said drainage apertures being situated within said recessed or depressed area.

3. The sheet according to claim 2 which includes a pair of substantially concentrically raised ridge portion formed substantially centrally of said sheet, thereby defining a central recessed or depressed area within the innermost of said raised ridge portions and an annular recessed or depressed area between said inner and outer raised ridge portion and at least one drainage aperture in each of said recessed or depressed areas.

4. The sheet according to claim 3 which includes a plurality of radially extending raised ridge portions extending between said inner and outer raised ridge portions thereby defining a plurality of depressed or recessed areas between adjacent radially extending raised ridge areas and said inner and outer raised ridge areas and at least one drainage aperture within said central depressed or recessed area and within each of said plurality of depressed or recessed areas.

5. The sheet according to claim 1 in which the outer periphery of said sheet is reinforced.

6. The sheet according to claim 2 in which the outer periphery of said sheet is reinforced.

7. The sheet according to claim 3 in which the outer periphery of said sheet is reinforced.

8. The sheet according to claim 4 in which the outer periphery of said sheet is reinforced.

* * * * *